(12) United States Patent
Deng et al.

(10) Patent No.: US 9,057,930 B2
(45) Date of Patent: Jun. 16, 2015

(54) METHOD AND DEVICE FOR OPTICAL PARAMETRIC CHIRPED PULSE AMPLIFICATION

(75) Inventors: Yunpei Deng, Garching (DE); Ferenc Krausz, Garching (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 0 days.

(21) Appl. No.: 14/238,015

(22) PCT Filed: Aug. 1, 2012

(86) PCT No.: PCT/EP2012/003283
§ 371 (c)(1),
(2), (4) Date: Apr. 24, 2014

(87) PCT Pub. No.: WO2013/020671
PCT Pub. Date: Feb. 14, 2013

(65) Prior Publication Data
US 2014/0293405 A1    Oct. 2, 2014

(30) Foreign Application Priority Data
Aug. 10, 2011    (EP) ..................................... 11006577

(51) Int. Cl.
*G02F 1/39*    (2006.01)
(52) U.S. Cl.
CPC ............ *G02F 1/39* (2013.01); *G02F 2001/392* (2013.01); *G02F 2201/16* (2013.01)
(58) Field of Classification Search
CPC .. G02F 1/39; G02F 2001/392; G02F 2201/16
See application file for complete search history.

(56) References Cited

U.S. PATENT DOCUMENTS

| 2001/0017727 A1* | 8/2001 | Sucha et al. .................. 359/326 |
| 2002/0001321 A1* | 1/2002 | Perry ............................. 372/22 |

(Continued)

FOREIGN PATENT DOCUMENTS

| EP | 1724634 | 11/2006 |
| WO | WO 2005/112207 | 11/2005 |

OTHER PUBLICATIONS

Cho, et al., "Optical Parametric Chirped Pulse Amplification in Periodically Poled LiTaO3 at multi-kHz Repetition Rates," Proceedings of Lasers and Electro-Optics-Pacific Rim, CLEO/Pacific Rim 2007, pp. 1-2.

(Continued)

*Primary Examiner* — Eric Bolda
(74) *Attorney, Agent, or Firm* — Caesar Rivise, PC

(57) ABSTRACT

An optical parametric amplification device and method. The method includes providing a pump pulse having a pump pulse duration, providing a chirped seed pulse having a seed pulse duration, sequentially passing the pump and seed pulses through amplification stages, wherein the pump and seed pulses are coupled into the amplification stages with varying mutual temporal overlap and the seed pulse is amplified at each amplification stage, an amplified signal pulse is provided by the seed pulse after amplification in a last amplification stage, the seed pulse duration is longer than the pump pulse duration, the mutual temporal overlap of the pump and seed pulses is varied with different temporal ranges of the seed pulse amplified at each amplification stage. Compared with the seed pulse, the signal pulse has an increased energy in the spectral regions determined by the temporal overlap of the seed pulse with the pump pulse.

18 Claims, 7 Drawing Sheets

(56) References Cited

U.S. PATENT DOCUMENTS

2003/0137719 A1* 7/2003 Van Der Veer ............... 359/330
2014/0254618 A1* 9/2014 Shah et al. ..................... 372/20

OTHER PUBLICATIONS

Dubietis, et al., "Powerful Femtosecond Pulse Generation by Chirped and Stretched Pulse Parametric Amplification in BBO Crystal," Optics Communications, vol. 88, 1992, pp. 437-440.

Fuelop, et al., "Shaping of Picosecond Pulses for Pumping Optical Parametric Amplification," Appl. Phys. B 87, 2007, pp. 79-80.

Grace, et al., "Competing Processes in Optical Parametric Chirped Pulse Amplification," Optics Communications, vol. 261, 2006, pp. 225-230.

Guardalben, et al., "Design of a Highly Stable, High-Conversion-Efficiency, Optical Parametric Chirped-Pulse Amplification System with Good Beam Quality," Optics Express, vol. 11, No. 20, 2003, pp. 2511-2524.

Heese, et al., "1μ From a High Repetition Rate Femtosecond Optical Parametric Chirped-Pulse Amplifier in the Mid-Infrared," Lasers and Electro-Optics, 2009 and 2009 Conference on Quantum Electronics and Laser Science Conference, CLEO/QELS 2009. Conference on IEEE, Piscataway, NJ, USA, Jun. 2, 2009, pp. 1-2.

Hong, et al., "High-Energy, Phase-Stable, Ultrabroadband kHz OPCPA at 2.1 μm Pumped by a Picosecond Cryogenic Yb:YAG Laser," Optics Express, vol. 19, No. 16, 2011, pp. 15538-15548.

Major, et al., "Basic Concepts and Current Status of the Petawatt Field Synthesizer—A New Approach to Ultrahigh Field Generation," The Review of Laser Engineering, vol. 37, No. 6, 2009, pp. 101-106.

Metzger, et al., "High-Repetition-Rate Picosecond Pump Laser Based on a Yb:YAG Disk Amplifier for Optical Parametric Amplification," Optics Letters, vol. 34, No. 14, 2009, pp. 2123-2125.

Ross, et al., "The Prospects for Ultrashort Pulse Duration and Ultrahigh Intensity Using Optical Parametric Chirped Pulse Amplifiers," Optical Communications, vol. 144, 1997, pp. 125-133.

Ross, et al., "Analysis and Optimization of Optical Parametric Chirped Pulse Amplification," J. Opt. Soc. Am. B, vol. 19, No. 12, 2002, pp. 2945-2956.

Schulz, et al., "Yb:YAG Innoslab Amplifier: Efficient High Repetition Rate Subpicosecond Pumping System for Optical Parametric Chirped Pulse Amplification," Optics Letters, vol. 36, No. 13, 2011, pp. 2456-2458.

Tavella, et al., "Investigation of the Superfluorescence and Signal Amplification in an Ultrabroadband Multiterawatt Pptical Parametric Chirped Pulse Amplifier System," New Journal of Physics, vol. 8, 2006, pp. 1-12.

Waxer, et al., "High-Conversion-Efficiency Optical Parametric Chirped-Pulse Amplification System Using Spatiotemporally Shaped Pump Pulses," Optics Letters, vol. 28, No. 14, 2003, pp. 1245-1247.

Witte, et al., "Numerical Simulations for Performance Optimization of a Few-Cycle Terawatt NOPCPA System," Applied Physics B, Laser and Optics, vol. B 87, 2007, p. 677-684.

Wnuk, et al., "Multi-Terawatt Chirped Pulse Optical Parametric Amplifier With a Time-Shear Power Amplification Stage," Optics Express, vol. 17, No. 17, 2009, pp. 15264-15273.

Zhang, et al., "Study of the Stability of Optical Parametric Amplification," Optical Communications, vol. 184, 2000, p. 451-455.

Zhu, et al., "Numerical Studies of Optical Parametric Chirped Pulse Amplification," Optics and Laser Technology, vol. 35, 2003, p. 13-19.

International Search Report for corresponding PCT Application No. PCT/EP212/003283 dated Oct. 10, 2012.

* cited by examiner

METHOD AND DEVICE FOR OPTICAL PARAMETRIC CHIRPED PULSE AMPLIFICATION

CROSS-REFERENCE TO RELATED APPLICATIONS

This national stage application claims the benefit under 35 U.S.C. §371 of International Application No. PCT/EP2012/003283 filed on Aug. 1, 2012, entitled METHOD AND DEVICE FOR OPTICAL PARAMETRIC CHIRPED PULSE AMPLIFICATION, whose entire disclosures are incorporated by reference herein.

FIELD OF THE INVENTION

The present invention relates to a method of optical parametric chirped pulse amplification (OPCPA) of laser pulses. Furthermore, the present invention relates to an optical parametric chirped pulse amplification device (OPCPA device), in particular including multiple amplification stages. Applications of the invention are available in the pulse laser technique, e.g. for measuring, signal generation or material processing purposes.

BACKGROUND OF THE INVENTION

In the present specification, reference is made to the following publications illustrating conventional techniques.
[1] A. Dubietis, G. Jonusauskas, and A. Piskarskas, "Powerful femtosecond pulse generation by chirped and stretched pulse parametric amplification in BBO crystal," Opt. Commun. 88(4-6), 437-440 (1992).
[2] I. N. Ross, P. Matousek, M. Towrie, A. J. Langley, and J. L. Collier, "The prospects for ultrashort pulse duration and ultrahigh intensity using optical parametric chirped pulse amplifiers," Opt. Commun. 144, 125 (1997).
[3] I. N. Ross, P. Matousek, G. H. C. New, and K. Osvay, "Analysis and optimization of optical parametric chirped pulse amplification," J. Opt. Soc. Am. B 19, 2945 (2002).
[4] S. Witte, R. T. Zinkstok, W. Hogervorst, and K. S. E. Eikema, "Numerical simulations for performance optimization of a few-cycle terawatt NOPCPA system," Appl. Phys. B 87, 677 (2007).
[5] E. J. Grace, C. L. Tsangaris, and G. H. C. New, "Competing processes in optical parametric chirped pulse amplification," Opt. Commun. 261, 225 (2006).
[6] P. Zhu, L. Qian, S. Xue, and Z. Lin, "Numerical studies of optical parametric chirped pulse amplification," Optics and Laser Technology 35, 13 (2003).
[7] M. Guardalben, J. Keegan, L. Waxer, V. Bagnoud, I. Begishev, J. Puth, and J. Zuegel, "Design of a highly stable, high-conversion-efficiency, optical parametric chirped-pulse amplification system with good beam quality," Opt. Express 11, 2511 (2003).
[8] F. Tavella, A. Marcinkevičius, and F. Krausz, "Investigation of the superfluorescence and signal amplification in an ultrabroadband multiterawatt optical parametric chirped pulse amplifier system," New J. of Phys. 8, 219 (2006).
[9] J. A. Fueloep, Zs. Major, B. Horvath, F. Tavella, A. Baltuška and F. Krausz, "Shaping of picosecond pulses for pumping optical parametric amplification," Appl. Phys. B 87, 79 (2007).
[10] S. K. Zhang, M. Fujita, M. Yamanaka, M. Nakatsuka, Y. Izawa, and C. Yamanaka, "Study of the stability of optical parametric amplification," Opt. Commun. 184, 451 (2000).
[11] L. J. Waxer, V. Bagnoud, I. A. Begishev, M. J. Guardalben, J. Puth, and J. D. Zuegel, "High-conversion-efficiency optical parametric chirped-pulse amplification system using spatiotemporally shaped pump pulses", Vol. 28, No. 14 OPTICS LETTERS 1245
[12] Paweł Wnuk, Yuriy Stepanenko, and Czesław Radzewicz, "Multiterawatt chirped pulse optical parametric amplifier with a time-shear power amplification stage", Vol. 17, No. 17/OPTICS EXPRESS 15264
[13] Thomas Metzger, Alexander Schwarz, Catherine Yuriko Teisset, Dirk Sutter, Alexander Killi, Reinhard Kienberger, and Ferenc Krauszl, "High-repetition-rate picosecond pump laser based on a Yb:YAG disk amplifier for optical parametric amplification" Vol. 34, 2123, OPTICS LETTERS (2009)
[14] M. Schulz, R. Riedel, A. Willner, T. Mans, C. Schnitzler, P. Russbueldt, J. Dolkemeyer, E. Seise, T. Gottschall, S. Hädrich, S. Duesterer, H. Schlarb, J. Feldhaus, J. Limpert, B. Faatz, A. Tünnermann, J. Rossbach, M. Drescher, and F. Tavella "Yb:YAG Innoslab amplifier: efficient high repetition rate subpicosecond pumping system for optical parametric chirped pulse amplification" 2456, Vol. 36, OPTICS LETTERS (2011)

Since the first demonstration of parametric amplification of chirped femtosecond pulses in β-barium borate (BBO) crystal by Dubietis et al. [1], optical parametric devices play a key role in many laser applications. They have proved versatile as widely tunable coherent sources, especially for short pulses since they can offer both high gain and high-gain bandwidth. Optical Parametric Chirped Pulse Amplifiers (OPCPAs) have become increasingly popular tools for the generation of high peak power pulses including pulses with TW and PW power levels in the visible to infrared range. Today there is much interest in the development of OPCPAs as a light source for few-cycle, high-intensity, near-to-mid-infrared pulse-driven applications such as high harmonic generation and attosecond techniques.

In OPCPA systems, a high-energy pump laser is coupled to a chirped, low-energy broadband seed field in an optically nonlinear crystal. If the seed pulse duration is stretched to match the pump pulse duration and ensure a proper temporal overlap, a reasonable amplification can be achieved. The efficiency is around 30%, including signal and idler.

In broad bandwidth OPCPA laser systems, the efficiency of the whole system depends on phase-matching temporal profile, temporal pump pulse profile, spatial pump beam profile, and pulse duration matching. The pump- and phase-mismatch temporal profiles cause spectral narrowing. In order to achieve the full phase-matching bandwidth of the amplifier, conventionally the seed pulse is kept short enough, relative to the pump pulse, that the pump intensity remains more-or-less constant across the duration of the seed. However, for very short seed pulses only a small fraction of the pump pulse is depleted and the efficiency decreases with increasing amplifier bandwidth.

On the other hand, the pump beam is Gaussian in time and space, and saturation is achieved at different lengths of the crystal for different positions in the beam, which means that some parts of the beam are not saturated while other are over-saturated. In order to achieve perfect saturation and close to complete conversion efficiency, conventionally an ideal square spatial and temporal pump pulse profile, a perfect phase-match temporal profile and pulse duration matching was needed.

FIGS. 8 to 10 schematically illustrate examples of the conventional OPCPA techniques using a single amplification stage (FIGS. 8, 9) or multiple amplification stages (FIG. 10).

FIG. 8 (prior art) schematically illustrates the scheme of a conventional OPCPA system including a pump pulse laser 10' and a seed pulse laser 20'. The pump pulse laser 10' creates laser pulses e.g. having a pump pulse duration of 1 ps and a pump pulse energy of 10 mJ while the seed pulse laser creates laser pulses having a seed pulse duration of 0.7 ps and a seed pulse energy of 0.1 mJ. The pump and seed pulses 1', 2' are superimposed in the optically non-linear OPA crystal 30', where an amplified signal pulse and an idle pulse are output. FIG. 9 (prior art) illustrates examples of an output spectrum of the signal pulses (FIG. 9A), a dependency of the output energy on the length of the OPA crystal (FIG. 9B) and a phase mismatching of the signal pulses (FIG. 9C) using one single amplification stage only. The maximum output obtained with the technique of FIG. 8 using the above examples is e.g. 1.8 mJ, wherein the efficiency is about 36% (signal+idle pulses).

According to FIG. 8 (prior art), since the pump beam is Gaussian in time and space, the gain of the OPCPA is highest in the peak point. The pump pulse depletes fastest in the peak point and saturates first. Afterwards, when the other parts are becoming saturated, the parts which were saturated are undergoing back conversion. In order to amplify the whole bandwidth of the seed, the seed pulse duration is shorter than the pump pulse duration. The part energy of pump pulse which has no overlap with seed is wasted.

A prerequisite for the development of OPCPA is a careful investigation into the simultaneous optimization of conversion efficiency, and signal bandwidth. Previous studies of OPCPA optimization have treated several aspects of this problem independently [2-10]. The two earlier works by Ross et al. [2, 3] discuss the trade-off between amplifier bandwidth and conversion efficiency that is determined by the signal pulse chirp. Publication [3] finds that amplifier conversion efficiency and efficiency-bandwidth product are maximized at approximately the same propagation length, and for Gaussian pump and seed pulses finds that a ratio of seed and pump pulse durations, of 0.57 optimizes the efficiency-bandwidth product. A recent work by Witte et al. [4] on a terawatt non-collinear OPCPA system focuses on the spectral shaping due to both the phase-matching conditions and the pump intensity profile, and finds a different optimum, 0.2-0.3. This discrepancy highlights the need for a systematic analysis of the optimal seed/pump duration ratio and of its dependence on OPCPA parameters, such as the total gain.

Until right now, there are two ways to increase the efficiency of OPCPA system, which are described as follows. Firstly, spatiotemporally shaped pump pulses can be used in order to optimize the OPCPA conversion efficiency by homogeneously depleting the pump in space and time [11]. In this method, a modified pump spatial and temporal profiles is created. A flat-top spatial profile and high order super-Gaussian temporal profile are often used in such method. By using a spatiotemporally shaped pump pulse to maximize the conversion efficiency of OPCPA, pump-to-signal conversion efficiency can reach 29%.

Secondly, a time-share power amplification stage can be used in order to increase conversion efficiency from a long pump pulse [12] as shown in FIG. 10 (prior art). With this technique, pump pulses (8 ns) from a pump pulse laser 10' are superimposed with seed pulses (1 ns) from a seed pulse laser 20' at three amplification stages 31', 32' and 33'. The light path of the seed pulses is adjusted so that the seed pulses are superimposed with different ranges of the pump pulses at each amplification stage. Thus, a stepwise increasing signal pulse is created as schematically illustrated in the lower part of FIG. 10. In other words, to achieve high energy conversion efficiency, each pass of a relatively short seed pulse through the nonlinear crystal is delayed with respect to a long pump pulse as shown in FIG. 10. After three amplification stages 31', 32' and 33', a conversion efficiency of 34% was obtained for a 3 ns window of the 8 ns pump pulses. This corresponds to a totally efficiency of around 17%.

OBJECTIVE OF THE INVENTION

The objective of the invention is to provide an improved method of optical parametric chirped pulse amplification of laser pulses being capable of avoiding limitations and disadvantages of conventional techniques. In particular, the objective of the invention is to provide an improved amplification method having an increased conversion efficiency and/or an increased amplification bandwidth. Furthermore, the objective of the invention is to provide an improved optical parametric amplification device, being capable of avoiding limitations and disadvantages of the conventional technique and in particular allowing an amplification with increased efficiency and/or increased bandwidth.

SUMMARY OF THE INVENTION

The above objectives are solved by a method and/or a device comprising the features of the independent claims. Advantageous embodiments of the invention are defined in the dependent claims.

According to a first aspect, the above objective is solved by the general technical teaching of providing a method of optical parametric amplification, wherein pump and seed pulses are superimposed at multiple (at least two) amplification stages with a stepwise varying temporal overlap. Compared with the seed pulse, the signal pulse obtained by the amplification has an increased energy in the spectral regions determined by the temporal overlap of the seed pulse with the pump pulse. Accordingly, in spectral regions determined by the temporal overlap of the seed pulse with the pump pulse, the signal pulse has an energy larger than the seed pulse.

Contrary to the conventional techniques, the seed pulse has a longer duration compared with the pump pulse and the temporal overlap is varied such that different temporal ranges of the seed pulse are amplified at each of the amplification stages, respectively. As outlined above, in a conventional OPCPA system, the seed pulse duration is around half of pump pulse duration. According to FIG. 10 and the publication [12] (P. Wnuk et al.), the seed pulse duration is much shorter than half of the pump pulse duration. In order to reach the same efficiency as a typical OPCPA system, P. Wnuk et al. use pumping at multiple stages. When the seed has been amplified by the few stages operated in saturation, the seed intensity will be higher than the remaining part of the pump intensity. At this point, the seed cannot efficiently extract energy from pump due to the temporal phase match profile, and instead will lose energy to competing nonlinear processes.

On the contrary, the present invention is based on different underlying physics: as the seed pulse duration is longer than pump pulse duration, the pump intensity is always higher than the intensity of the portion of the seed with which it temporally overlaps.

According to a second aspect, the above objective is solved by the general technical teaching of providing an optical parametric amplification device comprising a pump pulse source, a seed pulse source and multiple amplification stages arranged for amplifying the seed pulse using the pump pulse, wherein the seed and pump pulse sources are adapted for creating the seed pulse with a seed pulse duration, which is longer than the duration of the pump pulses.

In other words, the inventive idea is based on temporally distributing the pump pulse to different parts of seed pulse, which allows minimizing the phase mismatching in the different stages and increasing the efficiency of the OPCPA system. In the conventional OPCPA system and time-share OPCPA system, the seed pulse duration is much shorter than pump pulse duration to amplify as broad of a bandwidth as possible. On the contrary, the concept of an efficient and broadband OPCPA system proposes to stretch the seed pulse duration to be longer than the pump pulse duration, and amplify the different spectral and temporal ranges of the seed in different OPA stages. The inventive method, which is called temporal allocation of pump intensity remainder (TA-PIR), is capable to increase the efficiency of an OPCPA system to 80%, including signal and idler. In principle, the efficiency can even approach 100%.

As described with further details below, the pump pulse has an overlap with a part of seed pulse in time. The seed pulse is a chirped pulse, i.e. the seed pulse has a change of instantaneous frequency with time. After the first amplification stage, the remainder of the pump pulse can be used to amplify another part of seed in the different time range and different amplification stage. If there are more amplification stages and seed pulse is made even longer, the pump pulse can be used more and more even until complete depletion. Since the transfer of energy from the pump to the seed in an OPCPA is dependent on the pump intensity, the point of higher intensity in the beam depletes faster.

According to a preferred embodiment of the invention, an individual phase-matching of the pump and seed pulses is provided at each of the amplification stages. As an advantage, the phase-matching can be optimized at each stage and for different spectral ranges individually. Thus, while the above longer seed pulse duration is the key to increasing the efficiency, the invention provides a further advantage which could not be obtained with conventional techniques. Different spectral ranges can be amplified at different amplification stages. Each amplification stage provides an additional degree of freedom for adjusting spectral properties of the amplified signal pulse.

According to a further advantageous embodiment, the pump pulse can be subjected to a step of pump pulse shaping. The pump pulse is shaped such that the electro-magnetic field profile of the pump pulse has a rectangular or nearly rectangular shape in time and space. Preferably, pump pulse shaping is obtained by at least one of controlling the pump pulse intensity and the thickness of the optically non-linear crystal of each of the amplification stages.

According to the invention, the mutual temporal overlap of the pump and seed pulses is varied along a series of amplification stages. Preferably, this variation is provided by at least one optical delay path. Preferably, one optical delay path is arranged between two of the at least two amplification stages. As a preferred example, each optical delay path comprises a plurality of deflection mirrors, wherein at least two of the deflection mirrors are moveable relative to the remaining deflection mirrors and the amplification stages. The at least one optical delay path can be provided along at least one of the beam paths of the seed pulses and pump pulses.

As an advantage of the invention, it has been found that an increased efficiency of optical parametric amplification can be obtained with two amplification stages already. However, according to preferred embodiments of the invention, at least three, particularly preferred at least four amplification stages are provided. The number of amplification stages can be optimized in dependency on the particular application of the invention and in particular in dependency on method conditions, like loss from mirrors, crystals and non-linear effects in the crystals.

According to a particularly preferred embodiment of the invention, the seed pulse is completely covered by the multiple superpositions with the pump pulse at the different amplification stages. The varying temporal overlap is adjusted such that after passage of the last amplification stage, all temporal ranges (portions on the time scale) of the seed pulse are amplified. As an advantage, the amplification efficiency can be optimized with this embodiment.

According to a further embodiment of the invention, spectral properties of the signal pulse are specifically adjusted at each of the at least two amplification stages through adjustment of the time delays between pump and seed pluses, and/or crystal phase matching conditions. Here, the pump pulse will overlap with different parts of seed pulse at different times and/or different frequencies.

Generally, the inventive parametric amplification has an increased efficiency if the seed pulse is longer than the pump pulse. The invention can be implemented with seed and pump pulses on all time-scales, in particular fs-, ps-, and ns-time-scales. As a particularly advantageous relationship between the seed pulse duration and the pump pulse duration, the inventors have found that the seed pulse duration preferably is at least equal to 0.7*pump pulse duration*number of amplification stages.

A further advantage of the invention is given by the fact that each of the amplification stages may consist of one optically non-linear crystal only.

In summary, the advantages of the invention are as follows:
1. the whole pump energy can be used, and
2. the phase matching can be optimized in the different crystals, and
3. (optionally) the pump pulse shape can be modified in space and time.

By these advantages, the inventive system is an essentially improved complete pump depletion optical parametric amplifier system, and also a good super broad bandwidth optical parametric amplifier system.

BRIEF DESCRIPTION OF THE DRAWINGS

Further details and advantages of the invention are described in the following with reference to the attached drawings, which show in.

DESCRIPTION OF PREFERRED EMBODIMENTS

Preferred embodiments of the invention are described here with exemplary reference to the optical set up being adapted for implementing the optical parametric amplification method of the invention. Details of components of the optical setup and the operation thereof, like e.g. details of the seed and pump pulse sources or the OPA crystals or the adjustment thereof, are not described as far as they are known from prior art technique. Furthermore, reference is made to seed and pump pulses having pulse durations in the ps-range. It is emphasized that the invention is not restricted to the use of ps pulses, but correspondingly possible with seed and/or pump pulses having durations in the fs- to ns-range. While the invention is described in the following with exemplary reference to optical parametric amplification devices having two, three or four amplification stages, it is emphasized that an increased number of amplification stages, like five, six or even more stages can be used. The invention can be implemented by repeatedly superimposing one single pump pulse and one single seed pulse. However, in practical applications pulse sources creating pulse trains with high repetition frequency are used wherein the pump pulses and seed pulses are repeatedly superimposed pairwise.

Figure 1:
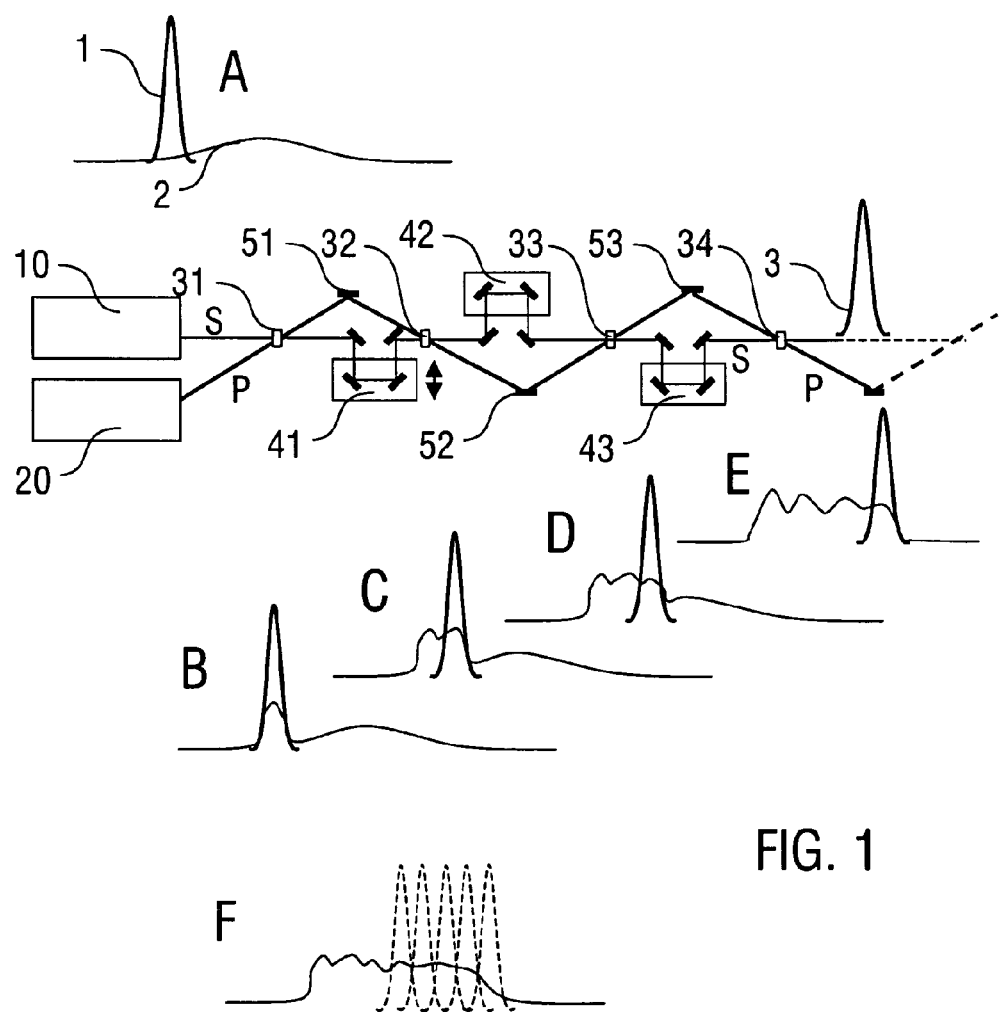
FIG. 1: a first embodiment of an optical parametric amplification device according to the invention including four amplification stages.

FIG. 1 schematically illustrates the optical setup of a first embodiment of the optical parametric amplification device 100 including four amplification stages. The OPCPA device 100 comprises a pump pulse source 10, a seed pulse source 20, multiple amplification stages 31, 32, 33 and 34 and optical delay paths 41, 42, 43. A first light path P (pump pulse light path, thick line) is spanned from the pump pulse source 10 via the amplification stages 31, 32, 33, 34. Furthermore, a second light path S (seed pulse light path, thin line) is spanned from the seed pulse source 20 via the amplification stages 31, 32, 33 and 34. The amplification stages 31, 32, 33 and 34 are arranged along a straight reference direction, e.g. along the direction of the seed pulses output from the seed pulse source 20. The pump pulse path P is inclined relative to the seed pulse path in each of the amplification stages 31, 32, 33 and 34. The angle between both light paths S and P is selected in particular for fulfilling the phase matching condition at each of the amplification stages 31, 32, 33 and 34. For redirecting the pump pulses from the pump pulse source 10 and for adjusting the angle between the seed and pump pulse path S, P, deflection mirrors 51, 52, 53 are provided between pairs of amplification stages. Furthermore, for adjusting the temporal overlap between the seed and pump pulses, the optical delay paths 41, 42 and 43 comprise deflection mirrors being arranged for creating an optical delay path with variable path lengths between two of the amplification stages 31, 32, 33 and 34, respectively.

The pump pulse source 10 is a pulse laser, e.g. a disk laser (e.g. as described in [13]) or an Innoslab laser system (e.g. as described in [14]), which creates pump pulses with a pump pulse duration 1 ps, a pump pulse energy 10 mJ and a center wavelength of about 510 nm. The seed pulse source 20 is a pulse laser as well, like e.g. broadened Ti:Sa pulse laser. Chirped seed pulses are created with a seed pulse duration of 2.9 ps, a seed pulse energy of 0.1 mJ, and a center wavelength of 1000 nm. Both seed and pump pulses are provided with a repetition rate of 3 kHz. Each of the amplification stages 31, 32, 33 and 34 comprises an optically non-linear crystal, like e.g. a BBO crystal. Preferably, the same crystal type is used at each of the stages. The crystal thickness can vary between the different stages, e.g. for fulfilling the phase matching condition and keeping a rectangular temporal and spatial profile of the pump pulse. As an example, the thickness of the crystals may vary in a range from few mm to few nm.

The deflection mirrors 51, 52 and 53 and the deflection mirrors of the optical delay paths 41, 42 and 43 comprise plane mirrors, e.g. high reflectivity dielectric mirrors each of which being supported by an adjustable mirror support.

The stepwise amplification of the seed pulse 2 using the inventive method is schematically illustrated in FIG. 1. According to the partial image A, the pump pulse 1 and the seed pulse are created having different pulse durations. The pump and seed pulses 1, 2 are provided at the first amplification stage 31 such that the pump pulse 1 covers a first time range of the seed pulse 2. After optical parametric amplification in the first amplification stage 31, the seed pulse 2 is partially amplified as shown in partial image B of FIG. 1. Between the first and second amplification stages 31, 32, the temporal overlap of the pump and seed pulses is changed so that after the optical parametric amplification in the second amplification stage 32, a further temporal range of the seed pulse 2 is amplified as illustrated in partial image C of FIG. 1. With the next variation of the temporal overlap, third and fourth temporal ranges of the seed pulse 2 are amplified as shown in partial images D and E of FIG. 1. Depending on the ratio of the pulse durations and the number of amplification stages, even more than four temporal ranges of the seed pulse can be amplified as schematically shown in partial image F of FIG. 1. After passage of the last amplification stage, e.g. stage 34 in FIG. 1, the seed pulse provides the amplified signal pulse 3. With the pulse parameter examples mentioned above, a maximum output of 4 mJ can be obtained corresponding to an efficiency of 80% (signal plus idle).

Figure 2:
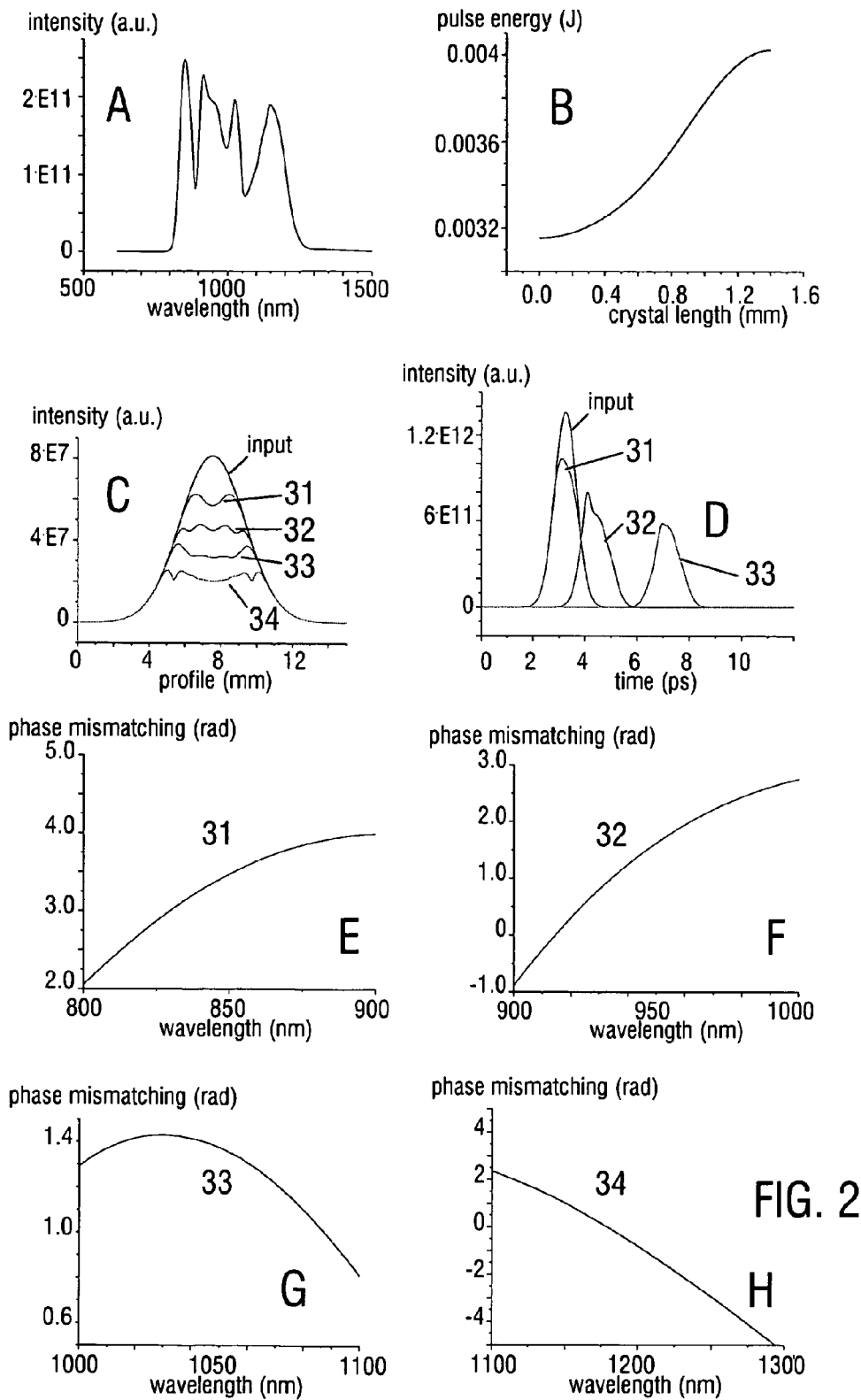
FIG. 2: graphical representations of pulse properties obtained with the embodiment of FIG. 1.

FIG. 2 includes graphical representations of pulse and phase mismatching properties obtained with a simulation of the optical setup of FIG. 1. FIG. 2A shows the output spectrum of the seed pulse 2 (=signal pulse 3) after the fourth amplification stage 34. FIG. 2B shows the dependency of the output energy at the fourth amplification stage 34 on the crystal length of the fourth amplification stage 34.

The spatial and temporal development of the beam profile along the amplification stages is illustrated in FIGS. 2C and 2D. According to FIG. 2C, the spatial profile of the pump pulses changes from a Gaussian profile provided by the pump pulse source 10 (input) to a nearly rectangular profile after the fourth amplification stage 34. The shift of the temporal position of the pump pulse relative to the seed pulse is shown in FIG. 2D (input and output of 31, 32 and 33). Finally, FIGS. 2E to 2H show that different phase mismatching can be provided at each of the amplification stages 31 to 34. In the simulation results presented in FIG. 2, the same pump beam size was used for all amplification stages. In practice, the pump beam size can be reduced stepwise after each of the amplification stages, to keep the same pump intensity for the following amplification stages. To this end, optical beam shaping elements, including optical lenses, may be arranged along the pulse beam path P between pairs of amplifications stages.

Figure 3:
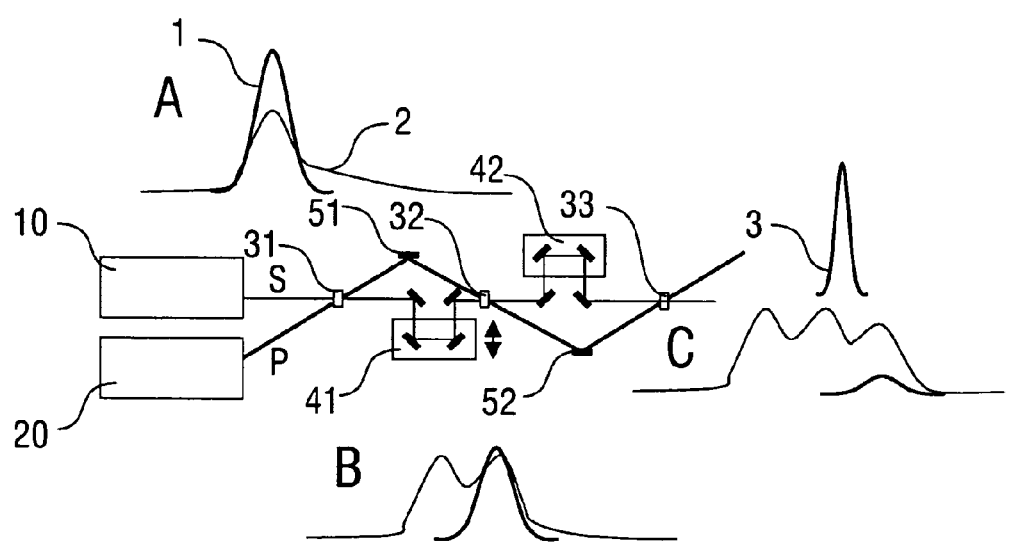
FIG. 3: a second embodiment of an optical parametric amplification device according to the invention including three amplification stages.
Figure 3:
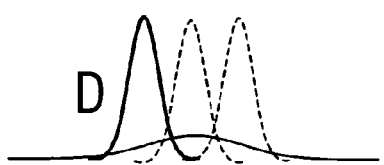

FIG. 3 illustrates an alternative embodiment of the invention, wherein only three amplification stages 31, 32 and 33 are used. Like with the embodiment of FIG. 1, the optical parametric amplification device 100 comprises a pump pulse source 10 and a seed pulse source 20 creating pump and seed pulses 1, 2, respectively. The pump pulse path P is spanned from the pump pulse source 10 via the amplification stages 31, 32 and 33 and the deflection mirrors 51 and 52. The amplification stages 31, 32 and 33 are arranged along a straight reference direction. The seed pulse path S is spanned from the seed pulse source 20 via the amplification stages 31, 32 and 33 and the optical delay paths 41, 42.

Figure 4:
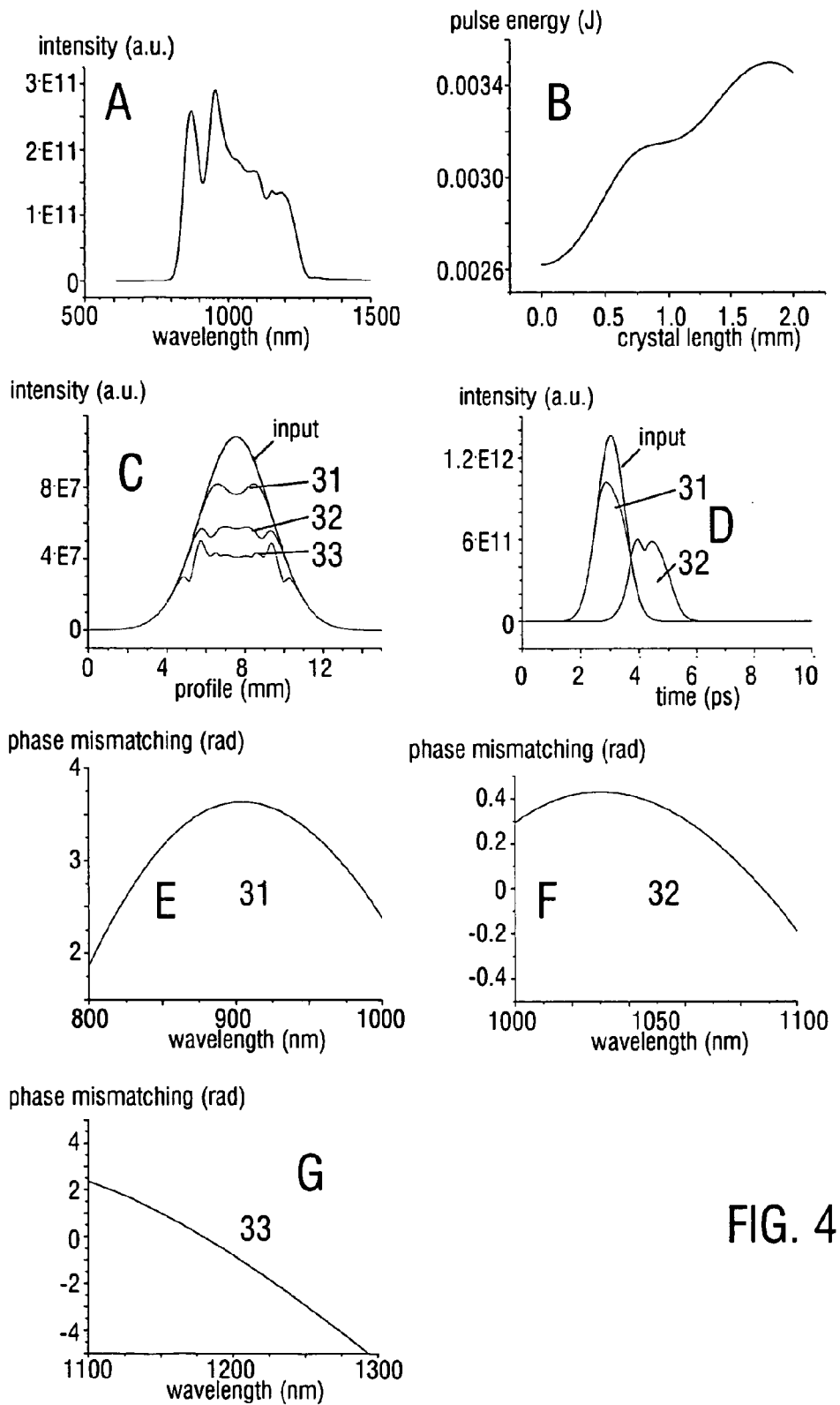
FIG. 4: graphical representations of pulse properties obtained with the embodiment of FIG. 3.

Similar to FIG. 1, the partial images A, B and C show the stepwise amplification of the seed pulse 2 using the pump pulse 1 which is temporarily shifted relative to the seed pulse (partial image D). After the passage of the third amplification stage 33, a completely amplified signal pulse 3 is output. Similar to FIG. 2, FIG. 4 illustrates graphical representations of simulation results obtained with the optical setup of FIG. 3. The output spectrum of the signal pulse 3 after the third amplification stage 33 is shown in FIG. 4A, while FIG. 4B shows the dependency of the output energy at the third amplification stage 33 on the crystal length of the optical crystal at the third amplification stage 33. The formation of a nearly rectangular pump beam profile is obtained similar to the embodiment of FIG. 1 as shown in FIG. 4C. FIG. 4D (input, output at 31 and 32, resp., of the pump pulse) shows as the pump pulse is temporarily shifted relative to the seed pulse. FIGS. 4E to 4G show the particular phase mismatching properties at each of the amplification stages 31, 32 and 33.

Figure 5:
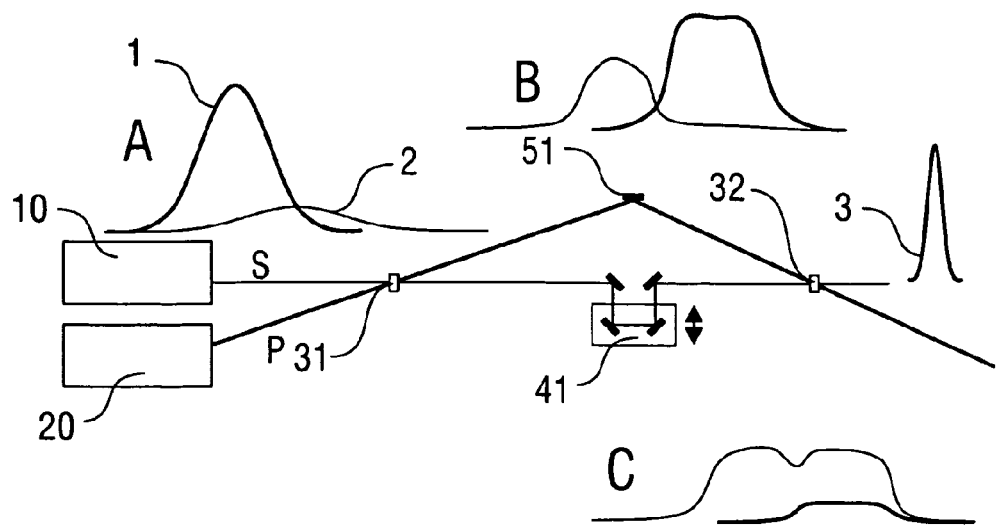
FIG. 5: a third embodiment of an optical parametric amplification device according to the invention including two amplification stages.

The structure of the optical setup can be even simplified if only two amplification stages 31, 32 are used as schematically shown in FIG. 5. The optical parametric amplification device 100 comprises the pump pulse source 10 and the seed pulse source 20. Pump pulses are directed via the first optical amplification stage 31 and a deflection mirror 51 to the second amplification stage, while seed pulses 2 are directed from the seed pulse source 20 through the first amplification stage 31 via the optical delay path 41 to the second amplification stage 32. As shown in the partial images A, B and C, the pump pulse 1 is shifted using the optical delay path 41 such that two temporal ranges of the seed pulse 2 are covered and amplified for creating the signal pulse 3.

Figure 6:
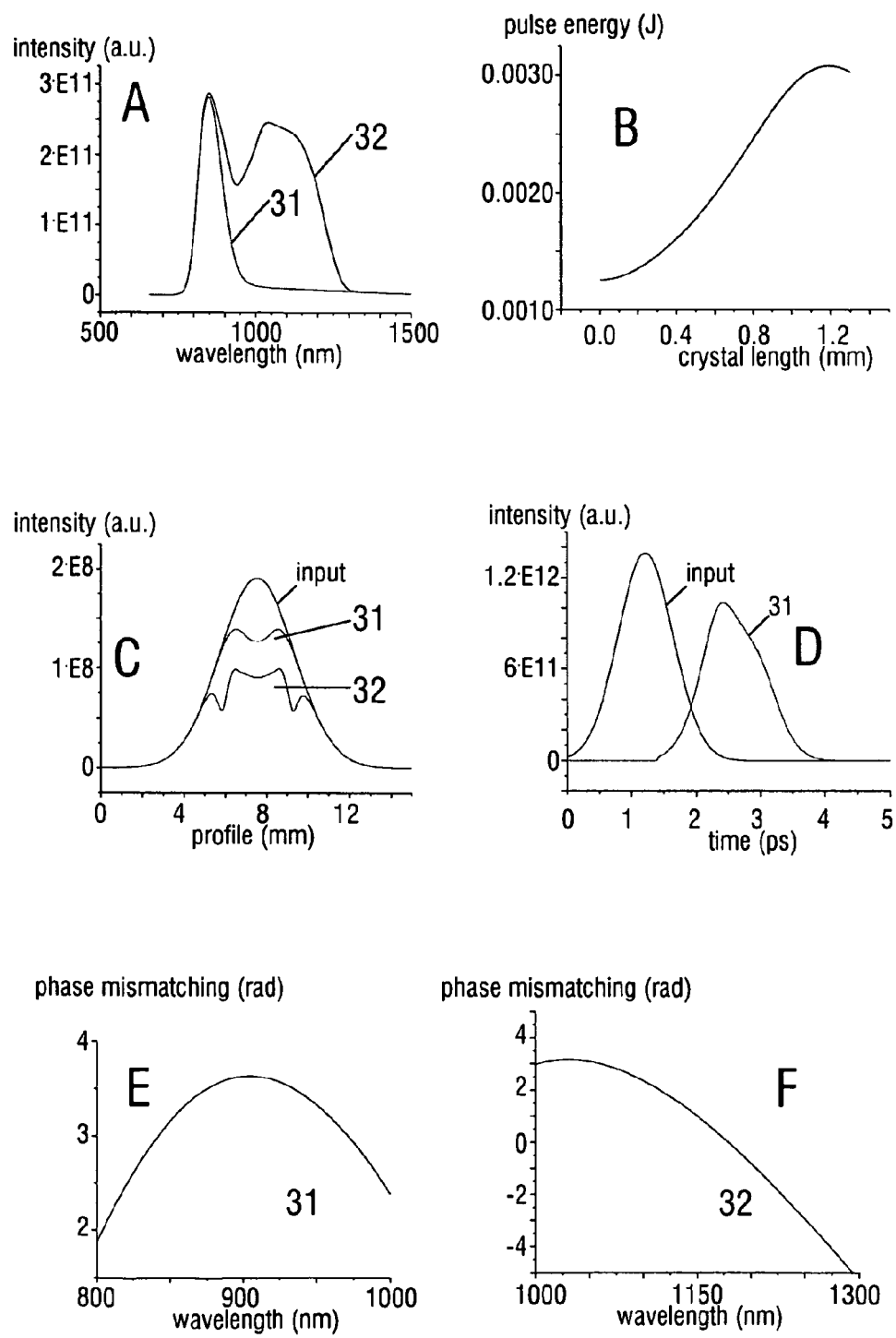
FIG. 6: graphical representations of pulse properties obtained with the embodiment of FIG. 5.
Figure 8:
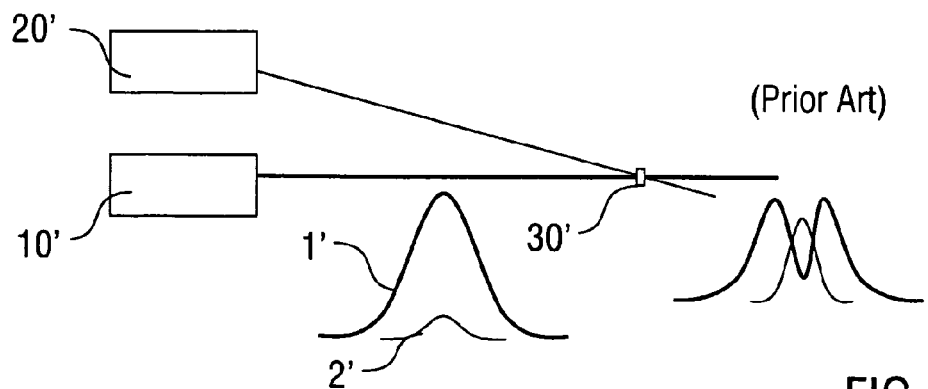
FIGS. 8 to 10: schematic illustrations and graphical representations of conventional optical parametric amplification techniques (prior art).
Figure 9:
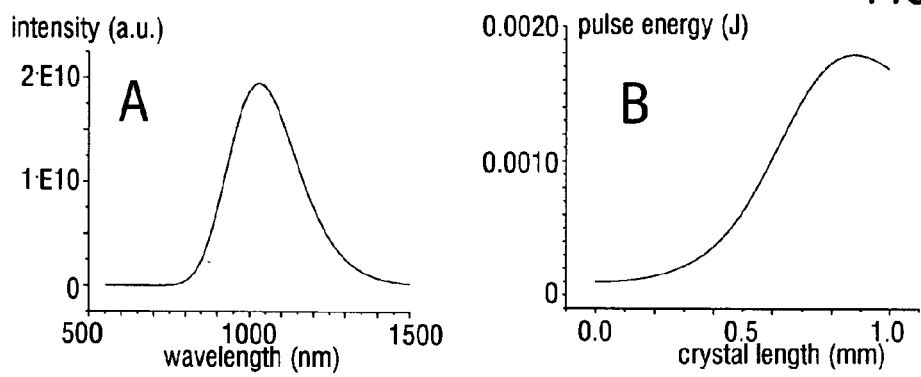
Figure 9:
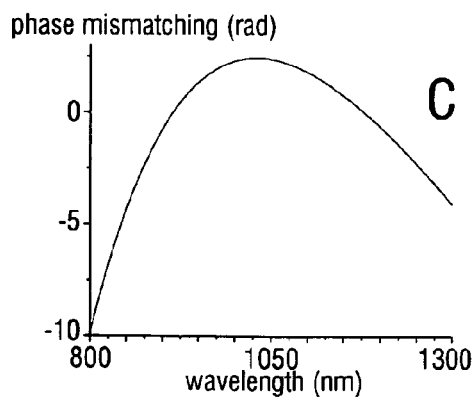
Figure 10:
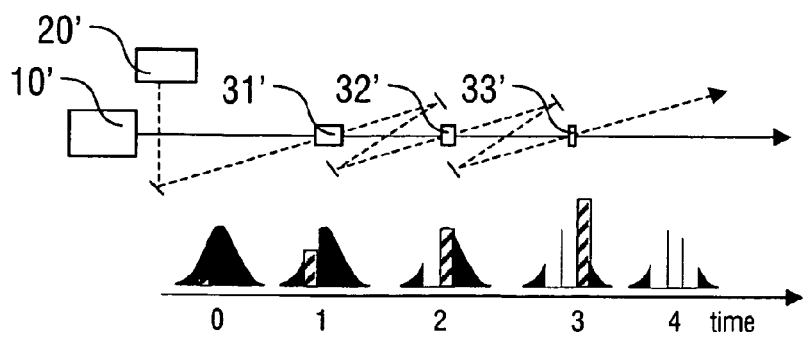

The advantages of the invention can be obtained even with the two amplification stage embodiment of FIG. 5. This is illustrated with the graphical representations of FIG. 6, which shows the output spectrum at the first and second amplification stages 31, 32, respectively (FIG. 6A), the dependency of the output energy of the second amplification stage 32 on the crystal length of the second amplification stage 32 (FIG. 6B), the pump beam profiling at the first and second amplification stages 31, 32, respectively (FIG. 6C), the temporal pump pulse shift (FIG. 6D) and the specific phase mismatching properties at the first and second amplification stages 31, 32, respectively (FIG. 6E, 6F).

Figure 7:
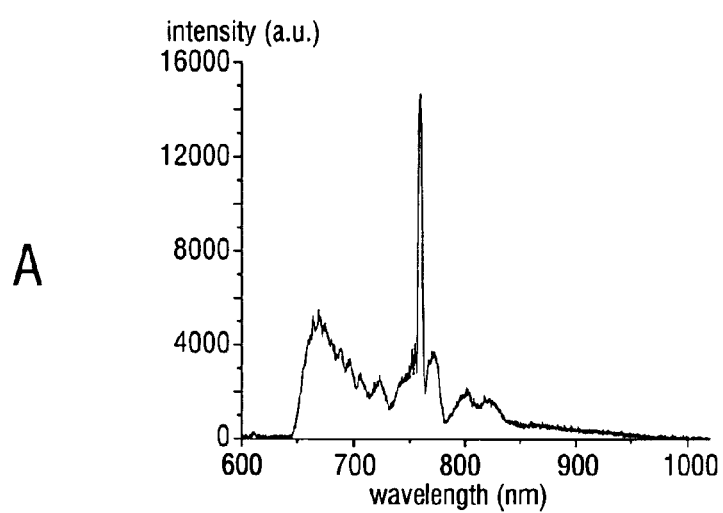
FIG. 7: graphical representations of experimental results obtained with the embodiment of FIG. 5.
Figure 7:
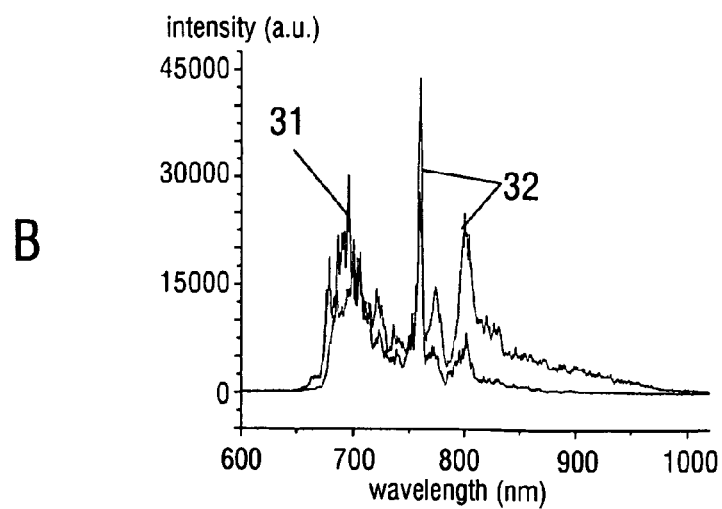

FIG. 7 shows experimental results obtained with the embodiment of FIG. 5 using a pump pulse with an energy around 7.6 mJ., a pump pulse duration around 1.6 ps and a wavelength of 515 nm. While FIG. 7A shows the spectrum of the seed pulse (energy around 100 µJ, pulse duration around 2.4 ps), FIG. 7B shows the spectrum of the output of the first amplification stage 31 (energy is 1.1 mJ) and the spectrum of the output of the second amplification stage 32 (energy is 2.3 mJ). The efficiency of creating the signal pulse 3 is 30%.

A high efficiency optical parametric amplifier system has been described. For improving complete pump depletion, good phase matching between seed and pump and an ideal square spatial, temporal pump pulse profile are preferably provided. By sharing the pump laser energy between the different parts of seed by varying the timing between in different amplification stages, phase matching is optimized. On the other hand, the pump pulse profile is optimized to be close to square in time and space. Then the OPCPA amplification stages for the remaining parts of the seed achieve high efficiency conversion.

The features of the invention disclosed in the above description, the drawings and the claims can be of significance both individually as well as in combination for the realization of the invention in its various embodiments.

The invention claimed is:

1. A method of optical parametric amplification, comprising:
    providing a pump pulse having a pump pulse duration,
    providing a chirped seed pulse having a seed pulse duration, and
    sequentially passing of the pump and seed pulses through at least two amplification stages, wherein the pump and seed pulses are coupled into the amplification stages with varying mutual temporal overlap and the seed pulse is amplified at each of the amplification stages wherein
    an amplified signal pulse is provided by the seed pulse after amplification in a last one of the amplification stages, wherein
    the seed pulse duration is longer than the pump pulse duration, and
    the mutual temporal overlap of the pump and seed pulses is varied such that different temporal ranges of the seed pulse are amplified at each of the amplification stages, and
    compared with the seed pulse, the signal pulse has an increased energy in the spectral regions determined by the temporal overlap of the seed pulse with the pump pulse.

2. The method according to claim 1, further comprising phase-matching of the pump and seed pulses individually at each of the amplification stages.

3. The method according to claim 1, further comprising pump pulse shaping for adapting the pump pulse to a rectangular shape in time and space.

4. The method according to claim 1, wherein the mutual temporal overlap of the pump and seed pulses is adjusted using at least one optical delay path being arranged between two of the at least two amplification stages, respectively.

5. The method according to claim 1, wherein at least three amplification stages are used for amplifying the seed pulse.

6. The method according to claim 1, wherein the mutual temporal overlap of the pump and seed pulses is varied such that all temporal ranges of the seed pulse are amplified after passage of the last amplification stage.

7. The method according to claim 1, wherein the seed pulse duration is at least 0.7*pump pulse duration multiplied with the number of amplification stages.

8. The method according to claim 1, wherein each of the amplification stages comprises one optically non-linear crystal.

9. The method according to claim 1, wherein spectral properties of the signal pulse are specifically adjusted at each of the at least two amplification stages.

10. An optical parametric amplification device, comprising:
    a pump pulse source being adapted for generating a pump pulse having a pump pulse duration,
    a seed pulse source being adapted for generating a chirped seed pulse having a seed pulse duration,
    at least two amplification stages being sequentially arranged for amplifying the seed pulse, wherein the at least two amplification stages are arranged such that the pump and seed pulses can be coupled into the amplification stages with varying mutual temporal overlap, wherein the seed pulse source and the pump pulse source are configured such that seed pulse duration is longer than the pump pulse duration, and are arranged such that the mutual temporal overlap of the pump and seed pulses is variable so that different temporal ranges of the seed pulse are amplified at each of the amplification stages.

11. The optical parametric amplification device according to claim 10, wherein are adapted for an individual phase-matching of the pump and seed pulses at each of the amplification stages.

12. The optical parametric amplification device according to claim 10, wherein the pump pulse source is adapted for generating the pump pulse having a rectangular shape in time and space.

13. The optical parametric amplification device according to claim 10, further comprising at least one optical delay path being arranged between two of the at least two amplification stages, resp., for adjusting the mutual temporal overlap of the pump and seed pulses.

14. The optical parametric amplification device according to claim 10, wherein each of the amplification stages comprises one optically non-linear crystal.

15. The optical parametric amplification device according to claim 10, further comprising at least three amplification stages.

16. The optical parametric amplification device according to claim 10, wherein the pump and seed pulse sources comprise pulse laser devices.

17. The optical parametric amplification device according to claim 10, further comprising at least four amplification stages.

18. The method according to claim 1, wherein at least four amplification stages are used for amplifying the seed pulse.

* * * * *